Jan. 2, 1962 W. B. EWING 3,015,156
METHOD OF MAKING A SHADE SCREEN
Filed April 29, 1957 2 Sheets-Sheet 1

INVENTOR.
Walkley B. Ewing
BY
ATTORNEYS

Jan. 2, 1962  W. B. EWING  3,015,156
METHOD OF MAKING A SHADE SCREEN
Filed April 29, 1957  2 Sheets-Sheet 2
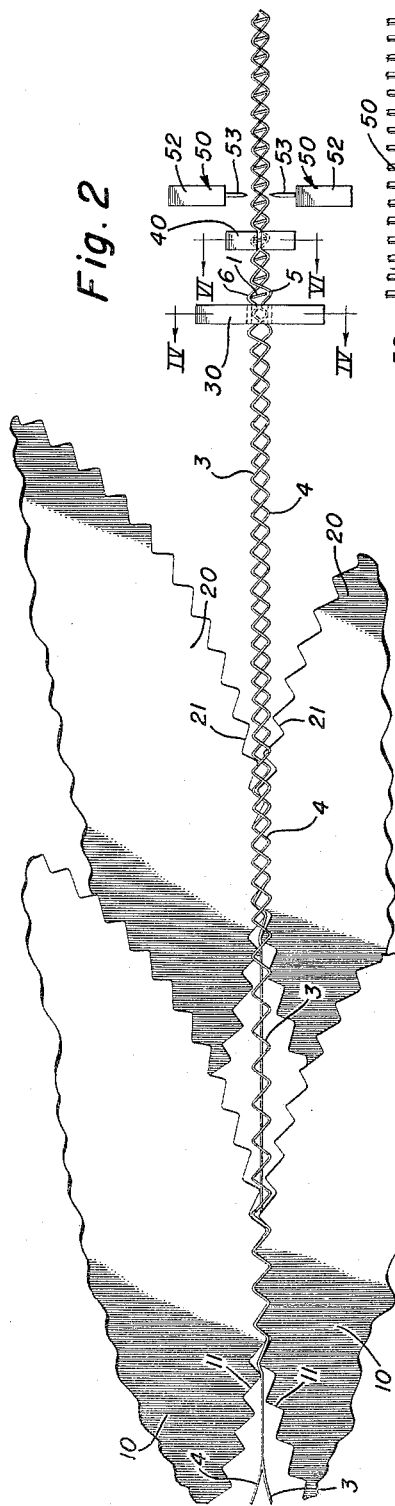
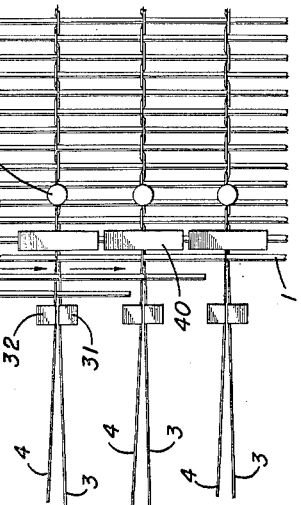
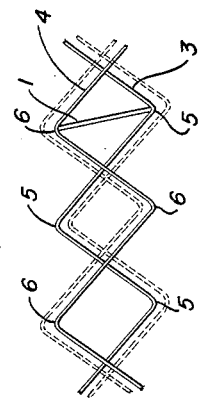
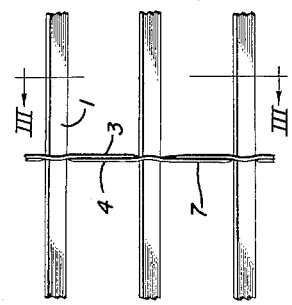
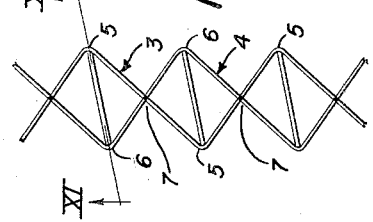
INVENTOR.
Walkley B. Ewing
BY
ATTORNEYS

United States Patent Office 3,015,156
Patented Jan. 2, 1962

3,015,156
METHOD OF MAKING A SHADE SCREEN
Walkley B. Ewing, East Grand Rapids, Mich., assignor to Ewing Development Company, Grand Rapids, Mich., a corporation of Michigan
Filed Apr. 29, 1957, Ser. No. 655,769
4 Claims. (Cl. 29—429)

This invention relates to a method of making screens.

The shade screen for which the method of this invention is particularly adapted is commonly referred to as screen cloth. It essentially consists of parallel louvers supported by warps extending transversely thereof. The first screen of this type is disclosed in the patent to Grebe 2,078,940, issued on May 4, 1937. Since the inception of the basic screen, various different types have been proposed and various methods of making them have been developed. The most common method of manufacture has been to weave the screen with weaving equipment such as that disclosed in the Ewing Patent Nos. 2,223,317 and 2,773,518.

These weaving machines have quills that function both to feed the warp wires and to move them relative to the medial plane of the louvers for the purpose of forming a shed for receiving the louver or filler wire. The quills produce an interlocking twist between each louver so as to firmly support the louvers in parallel planes.

The difficulties and problems confronting these machines are numerous. They rarely make a perfect screen. The warps frequently break as a result of the enormous tension required on the warps to maintain straightness. Reducing the tension tends to cause off center knots and a loose weave. The tension on the warps sometimes bends them or changes the louver pitch resulting in a non-uniform screen having erratic louver angle and spacing. One outstanding disadvantage of the weaving machine is that it lacks versatility. In other words, the fabric design, such as the louver ratios and angles, can rarely be changed on one machine without extensive changes in costly equipment.

An object of this invention is to provide a shade screen of a less complicated construction.

Another object of this invention is to provide an easier method of manufacturing any type screen.

Still another object of this invention is to provide a method for producing shade screens, such methods being versatile and thereby capable of inexpensively producing different fabric designs.

The above and other numerous objects and advantages of the present invention will become apparent from the following detailed descriptions made in conjunction with the accompanying drawing, wherein:

FIG. 2 is a schematic diagram of the apparatus for making the shade screen by this invention.

FIG. 3 is a plan view of the apparatus of FIG. 2.

FIG. 5 is a fragmentary side elevational view of the pre-formed warps and louver illustrating, in phantom, position of the warps when guided by the heddle to form the shed.

FIG. 9 is a fragmentary enlarged view of the shade screen.

FIG. 10 is a fragmentary, enlarged view of the shade screen taken along the plane X—X of FIG. 9.

Figure 1:
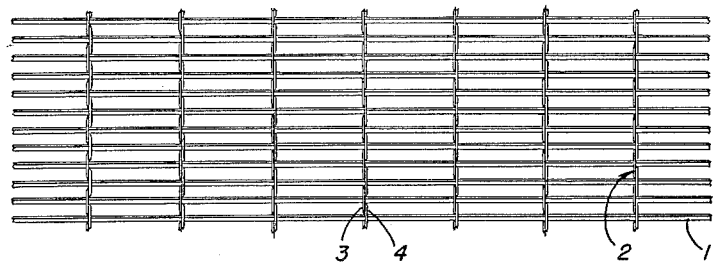
FIG. 1 is an elevational view of the shade screen fabric made in accordance with this invention.

Briefly, this invention relates to a shade screen of the type that includes a plurality of parallel louvers connected together with transversely extending warps. The warps include two wires preformed into a sinuous shape each composed of a plurality of successive waves.

The sinuous shaped wires are arranged side by side out-of-phase with each other thereby providing a louver support between the peaks of the waves. The louvers are located between the wave peaks and are supported thereby and means are provided for securing the wires together at points of intersection.

The method of this invention relating to the manufacture of the shade screen described above which method can also be applied to other types of screen is to provide wires made of the deformable material. These wires are formed into a sinuous shape comprising a plurality of successive waves. Then the waves are arranged out-of-phase with each other whereby they intersect each other and form a shed between the peaks of the waves for receiving the filler. The fillers are inserted in the shed and the wires are closed on them.

In one aspect of this invention the wires are coated with a heat fusible material and the last step in forming the shade screen is to apply heat to the warps at the points of intersection causing the wires to be fused together.

With reference now to the drawings wherein like reference numerals have been used to identify identical parts in each of the figures of the drawings, the shade screen comprises the louvers 1 connected together by the warps 2 which include two wires 3 and 4. The wires 3 and 4 are sinuous in shape and are arranged out-of-phase with each other so that the peaks 5 of the waves of wires 3 are located opposite the wave peaks 6 of wires 4 (FIG. 10). The wires 3 and 4 are not twisted about each other but merely intersect at the point 7 (FIGS. 9 and 10). At these points of intersection the wires are secured together by fusion such as by welding, soldering, or other suitable means.

By the use of the term fusion is meant the fusing of any material at the points of intersection 7. This can include fusing together the material from which the wire is constructed or fusing of additional material such as solder or even resinous material. One fusion means contemplated within the use of the term is pre-coating the wires with zinc, solder, plastic, or other heat fusible coating which upon application of heat causes the two wires to fuse together. High tensile steel, bronze, or aluminum wires coated with this material provide a practical coated wire that can be used. Suitable heating elements for fusing the wires together will be described in more detail hereinafter.

Figure 11:
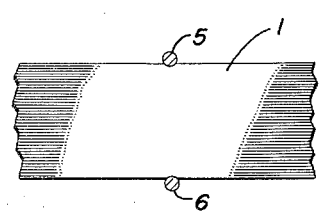
FIG. 11 is a fragmentary, enlarged view of the shade screen taken along the plane XI—XI of FIG. 10.
Figure 8:
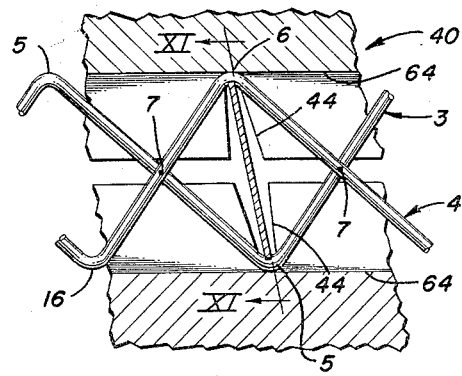
FIG. 8 is a cross-sectional elevational view taken along the plane VIII—VIII of FIG. 7.

The louvers 1 are flat ribbon-like metal strips extending the entire width of the screen section. The particular size, shape and material from which the louvers are constructed is relatively immaterial to this invention. Reference is made to Patent No. 2,078,940 which discloses louvers suitable for this type of shade screen. It is important that the width of the louvers somewhat exceeds the overall height of the preformed sinuous wire waves. I prefer they be slightly wider so that the peaks of the waves are set into the edges of the louvers under tension for supporting them more rigidly and preventing them from being slid out (FIG. 11).

Apparatus for producing this shade screen is illustrated in FIGS. 2 and 3. This apparatus includes two sets of rotary dies 10 and 20, a heddle 30, the clamper 40 and the heaters or welding elements 50.

The two sets of dies 10 and 20 have the same shaped teeth 11 and 21 respectively. The teeth 11 of the die set 10 mesh with each other and the teeth 21 of the die set 20 mesh with each other. The two dies 10 and 20 are laterally spaced one from the other (FIG. 3) thus each set of dies is capable of sinuating a strand of wire. Since the teeth are identical the waves of the sinuated wires are identical.

The dies 20 are shown located forwardly of the dies 10 to produce two sinuous wires 3 and 4 approximately out-of-phase. This spacing of the dies may be used to help the pitch or angle of the louvers since it controls the relative out-of-phase positions of the wave peaks 5 and 6 (FIG. 11). The louver angle is primarily and preferably controlled by the relative lengths of the individual leg of each V-shaped wave and the shape of the camming recesses of clamp 40 and an indexing channnel as described hereinafter. The dies 10 and 20 in accordance with a broader aspect of this invention can be reciprocating members capable of forming the wires into any desired sinuous shape.

Within the spirit of this invention the sets of dies 10 and 20 can be consolidated into single pair of drums. The correct phase relationship of the wires is then maintained by the finished screen and an indexing channel hereinafter described. The warps then could emerge in any phase relationship. Slack is allowed to permit the indexing channel, heddle, and clamper to produce the proper phase relationship while the louver is being inserted and wires welded together.

Figures 4, 6, 7:
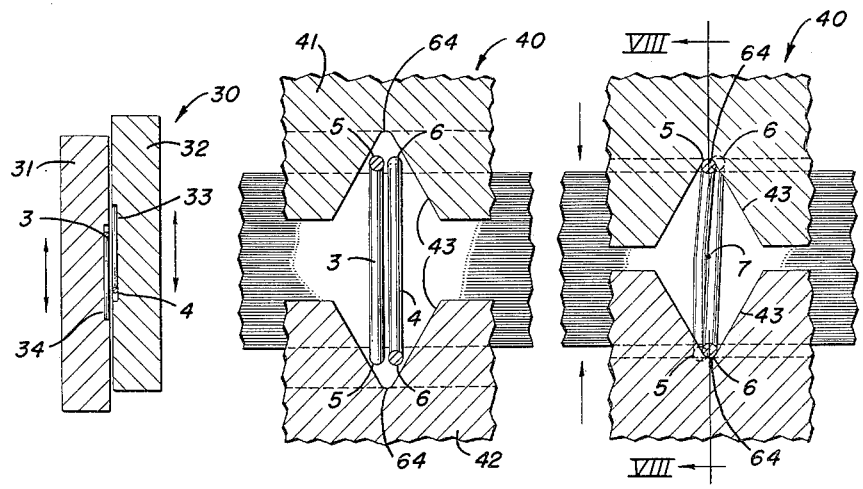
FIG. 4 is a cross-sectional elevational view taken along the plane IV—IV of FIG. 2 and illustrating the heddle which guides the warps to make a shed for the louvers.
FIG. 6 is a cross-sectional elevational view taken along the plane VI—VI of FIG. 2 illustrating the clamper in open position.
FIG. 7 is a cross-sectional elevational view taken along the plane VI—VI of FIG. 2 and illustrating the clamper in closed position.

After the sinuated wires 3 and 4 pass from the dies 10 and 20 they pass through the heddle 30. The heddle 30 includes two reciprocating members 31 and 32 (FIGS. 3 and 4) having the channels or grooves 33 and 34 each receiving one of the wires. The channel 34 receives the wire 3 and channel 33 the wires 4. The channels are approximately the same height as the waves of the wires. The heddle members 31 and 32 are reciprocated by any suitable mechanism.

In the operation of the heddle 30 for opening the wires 3 and 4 to insert a louver 1, the heddle member 31 pushes downwardly on one wave peak 5 of the wire 3 and heddle member 32 pushes upwardly on an opposite wave peak 6 of the wire 4. This causes two opposite peaks 5 and 6 located in the heddle to move toward each and the peaks 5 and 6 ahead of the heddle to be moved away from each other. This provides adequate shed for the louver 1 to be inserted as illustrated by FIGS. 2 and 5. The point of insertion of the louvers must be close to the heddle to get adequate shed. A guide channel (not shown) of the type disclosed in the Ewing Patent 2,223,317 is provided to guide the louver during injection.

After the louver 1 is inserted in the shed formed by the two opposite wave peaks 5 and 6, the wires and louvers individually pass through the clamper 40 which includes the reciprocating cam elements 41 and 42. The positioning clamper 40 is adapted to impress the wires into the edges of the louver and also positively cam the wires toward each other assuring that the touch at their points of intersection.

Each of the cam elements 41 and 42 have the V-shaped slots 44 running longitudinally for receiving the louvers when the clamper is closed. The grooves 43 are arranged to cam the wave peaks 5 and 6 in a transverse direction toward each other. This causes the peaks 5 and 6 in the clamper 40 to be located on a plane between the wires and thus cause the wires to touch at their points of intersection 7. The peaks 64 of the cam slots 43 indent the warps slightly in the louver edges as will be described in more detail hereinafter.

The clamper 40 can be located close to the heddle and be adapted for serving dual function of a clamper and louver injection guide channel. With this arrangement the screen take away system would be constructed to act as the forward indexing means. This system can be rollers geared to the screening for intermittently moving it ahead one mesh. Ratchet effect blades can be adapted to produce the same movement.

It may be preferable to index the screen by an indexing channel (not shown) located between heddle 30 and clamper 40. This indexing channel which holds the phasing of the wires while the heddle and clamper are open can be simply two long opposed V-groove members one for the upper portion of the waves and the other for the lower portions. They are synchronized to move forward while gripping the screen, then open and move back for a new bite after the clamper 40 has a hold. This indexing channel provides the means for setting the louver angle and eliminates any requirement for indexing by the dies.

The screen passes from the clamper 40 to a welding or heating instrument 50 which in the broadest aspect of this invention comprises one of any number of different types of apparatus for fusing the wires together at the crossing points 7.

The instrument 50 as disclosed is a welding instrument having a transformer body 52 and the welding tips 53. The tips are located on each side of the wires at the points of intersection 7.

In accordance with another aspect of this invention wherein the wires are coated with a fusible material such as tin, zinc or a special solder, a heater element can be substituted for the welding equipment shown in which case a knife edge heat electrode produces local heat at the fusion point. Direct contact with the wires is not required particularly if the heat is supplied by highly super heated steam. A dielectric or induction type heating can also be used to produce the required heat to fuse the coated wires together.

*Operation and method*

Having described the apparatus for producing the shade screen and practicing the method of this invention, its operation and the method of making the shade screen should be evident.

As previously described several pairs of wires 3 and 4 are provided depending upon the number of warps required in the shade screen. These wires are guided through the several pairs of dies 10 and 20 provided for each warp. The dies 20 are located forwardly of dies 10 and thus the wires emerge from the dies in a sinuous shape approximately 180 degrees out-of-phase providing a space between opposing wave peaks 5 and 6 of the respective wires other indexing means previously described can be utilized.

The wires pass through the heddle 30 which is actuated in sequence with the louver feeding mechanism (not shown), the clamper 40, and welding equipment 50. The dies 10 and 20 are either intermittently or at a constant feed depending on the apparatus available for indexing the screen. The wires in any event are fed step-by-step through the heddle 30. During each step the heddle squeezes the wires toward each other by means of the grooves 33 and 34 causing heddle element 31 to push wave peak 6 upwardly. This closes the space between the peaks in the heddle but at the same time opens the space between the peaks located forwardly of the heddle providing adequate shed between the peaks; this shed receives the louvers 4 that are intermittently fed between the wires in timed sequence with the step-by-step movement of the wires through the heddle. At the same time, the clampers 40 located forwardly of the spot where the louvers are being injected clamp down on wires 3 and 4 containing a louver. Clamping of the members 41 and 42 on the wires cams the wires over against each other and shortly thereafter impresses the wires into the louver edges positively positioning the wires on the louvers. The wires are thus held on the louvers in a position of intimate contact between each other at the points of intersection 7. The wires then move step-by-step to the welding equipment which welds the two wires together at the points of intersection 7. Numerous welds are necessary to keep the fabric from collapsing but it is not necessary that every point of intersection be welded. It is believed that welding every 4 or 5 points is satisfactory.

It should be understood that although I have not disclosed a specific means for synchronizing the action of the dies, the heddle, clamper, and the welding mechanism, such synchronizing mechanism is provided so that all of the operations are accomplished in timed sequence. The developments in such a mechanism is within the perview of one skilled in the art and therefore a detailed explanation is not considered necessary.

Having described my invention, it should be obvious that it has marked advantages over the conventional method of manufacturing this type of shade screen. The structure of the shade screen itself also has its advantages. The shade screen itself is strong, rigid and uniform thus producing a better product than heretofore has been possible with the weaving type machines.

This method and apparatus of this invention is versatile for making different fabric designs. For example, the angles of the louvers, can be changed by merely approximately changing the preforming dies 10 and 20, and the clampers 40.

*Modification*

Figure 12:
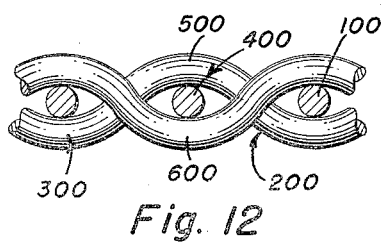
FIG. 12 is a fragmentary enlarged view of ordinary screen being fabricated by the method of this invention.

Within the broadest aspect of this invention, it can be applied with great simplification and operational advantages of the loom to an ordinary insect screen constructed of warps and a wire filler as disclosed in FIG. 12. In this modification the warps 200 are similar to that previously described but more closely spaced. The warps include the wires 300 preformed into a sinuous shape that is not as acute or deep as in the shade screen. Prior to the pressing action, later described, the filler 100 is a straight piece of wire rather than a flat thin louver. Since the fillers are round, no fusion is required between the warp wires 300.

The wire screen of FIG. 12 is constructed by substantially the same method previously described. The wires 300 are preformed and arranged approximately 180 degrees out-of-phase. Then preformed wave peaks 500 and 600 are caused to be separated by a heddle like that described or specially designed eyes that pull the peaks away from each other to provide clearance for shooting in the filler 100. I have found that wire ordinarily used in this type screen has sufficient rigidity when properly contained and guided so that long lengths can be injected without a bobbin or other attached part, into the shed formed between the peaks 500 and 600.

This action vastly reduces the magnitude of the heddle motion required in the conventional loom and makes possible the complete elimination of the bobbin and its complications.

After injecting the filler 400 the entire screen is press-rolled to sinuate the fillers 100 and positively form and compress the wires tightly together.

Having described my invention it should become obvious that although I have disclosed preferred embodiments, alterations and modifications are possible within the broadest aspect. Therefore, these alterations and modifications should be considered covered by this invention unless the claims by their language expressly state otherwise.

I claim:

1. A method of manufacturing screen having warps supporting louver members comprising the steps of: providing at least two warp wires constructed of deformable material in adjacent parallel planes; deforming each of said warp wires into sinuous shapes each having a plurality of waves with peaks; arranging said sinuous shaped warps in adjacent parallel planes out-of-phase with each other in generally peak to peak relationship; providing elongated louver members of greater width than thickness; separating opposite peaks of said warp members a distance greater than the width of said louver members; injecting said louver members between said separated peaks with their widths therebetween; and releasing and closing said peaks on the edges of said louver members to retain the louvers therebetween.

2. A method of manufacturing a shade screen composed of a plurality of parallel louvers connected together by warps, comprising the steps of: providing at least one pair of warp elements made of a deformable material; forming each of said warp elements into a sinuous shape comprising a plurality of successive waves; arranging said sinuous shaped warp elements in adjacent parallel planes out-of-phase with each other in generally peak to peak relationship whereby said warp elements periodically intersect each other intermediate the peaks thereof and form a louver support between the peaks of said waves; separating opposite peaks of said warp members; providing a plurality of louvers and injecting one between each of said opposite peaks; releasing and closing said peaks on the edges of said louver members; and securing said warps together at the points of intersection.

3. A method of manufacturing a shade screen composed of a plurality of parallel louvers connected together by warps, comprising the steps of: providing at least one pair of warp members made of a deformable material; forming each of said warp members into a continuous sinuous shape comprising a plurality of successive, general V-shaped portions; arranging said V-shaped portions of each warp member in adjacent parallel planes generally 180° out-of-phase with respect to each other whereby said warp members periodically intersect each other intermediate the peaks thereof and form a louver support between opposite V-shaped portions; separating opposite peaks of said warp members; providing a plurality of louvers and inserting one between each of the opposite V-shaped portions; coating said warp members with a heat fusible material, and securing said warp members together at the points of intersection by applying heat thereto causing said wires to be fused together.

4. A method of manufacturing a shade screen composed of a plurality of parallel louvers connected together by warps comprising the steps of: providing at least one pair of warp elements made of a deformable material forming each of said warp elements into a sinuous shape comprising a plurality of successive waves; arranging said formed warp elements in adjacent parallel planes out-of-phase with each other in peak to peak relationship whereby said warp elements periodically intersect each other intermediate the peaks thereof, spacing predetermined peaks of said waves a sufficient distance to receive a louver having a width essentially equal to the distance between the peaks of adjacent waves of one formed warp element; providing a louver and inserting it between said predetermined peaks; causing said warp elements to be moved to lie substantially on a common center line and causing said peaks to be depressed into opposite edges of said louver; and securing said warp elements together.

References Cited in the file of this patent

UNITED STATES PATENTS

| | | |
|---|---|---|
| 297,631 | Plimsoll | Apr. 29, 1884 |
| 1,706,524 | Farr | Mar. 26, 1929 |
| 1,927,498 | Lindsay et al. | Sept. 19, 1933 |
| 2,078,940 | Grebe | May 4, 1937 |
| 2,194,222 | Ewing | Mar. 19, 1940 |
| 2,333,618 | Strauss | Nov. 2, 1943 |
| 2,423,896 | Lave | July 15, 1947 |
| 2,547,632 | Ewing et al. | Apr. 13, 1951 |
| 2,737,208 | Harter | Mar. 6, 1956 |